(12) United States Patent
Grantz et al.

(10) Patent No.: US 8,618,706 B2
(45) Date of Patent: Dec. 31, 2013

(54) FLUID PUMPING CAPILLARY SEAL FOR A FLUID DYNAMIC BEARING

(75) Inventors: Alan L. Grantz, Aptos, CA (US); Lynn B. Le, San Jose, CA (US); Klaus Kloeppel, Watsonville, CA (US)

(73) Assignee: Seagate Technology LLC, Cupertino, CA (US)

( * ) Notice: Subject to any disclaimer, the term of this patent is extended or adjusted under 35 U.S.C. 154(b) by 1224 days.

(21) Appl. No.: 12/328,710

(22) Filed: Dec. 4, 2008

(65) Prior Publication Data

US 2010/0142869 A1    Jun. 10, 2010

(51) Int. Cl.
*H02K 5/124* (2006.01)

(52) U.S. Cl.
USPC ............. 310/90; 384/100; 384/119; 384/131; 384/132

(58) Field of Classification Search
USPC ................. 310/90; 384/100, 119, 131, 132
See application file for complete search history.

(56) References Cited

U.S. PATENT DOCUMENTS

| | | | |
|---|---|---|---|
| 5,246,294 A * | 9/1993 | Pan | 384/119 |
| 5,847,479 A | 12/1998 | Wang et al. | |
| 5,980,113 A | 11/1999 | Grantz | |
| 6,118,620 A | 9/2000 | Grantz et al. | |
| 6,149,161 A | 11/2000 | Grantz et al. | |
| 6,154,339 A | 11/2000 | Grantz et al. | |
| 6,181,039 B1 | 1/2001 | Kennedy et al. | |
| 6,322,252 B1 | 11/2001 | Grantz et al. | |
| 6,350,059 B1 | 2/2002 | Takahashi | |
| 6,583,952 B1 | 6/2003 | Grantz et al. | |
| 6,655,841 B1 | 12/2003 | Heine et al. | |
| 6,900,567 B2 | 5/2005 | Aiello et al. | |
| 6,900,568 B2 | 5/2005 | LeBlanc et al. | |
| 6,917,130 B2 | 7/2005 | Aiello et al. | |
| 6,955,471 B2 | 10/2005 | Heine et al. | |
| 6,982,510 B1 | 1/2006 | Ajello et al. | |
| 7,028,721 B2 | 4/2006 | Bowdoin et al. | |
| 7,073,944 B2 | 7/2006 | Aiello et al. | |
| 7,201,517 B2 | 4/2007 | Gomyo et al. | |
| 7,262,935 B2 | 8/2007 | LeBlanc | |
| 7,438,476 B2 | 10/2008 | Gotoh | |
| 7,455,457 B2 | 11/2008 | Gomyo et al. | |
| 7,513,688 B2 | 4/2009 | Uenosono et al. | |
| 7,825,557 B2 | 11/2010 | Drautz et al. | |
| 7,982,349 B2 | 7/2011 | Popov et al. | |
| 2004/0223673 A1 | 11/2004 | Tiller et al. | |
| 2006/0098907 A1 | 5/2006 | Hayashi et al. | |
| 2006/0147135 A1 | 7/2006 | Kim | |
| 2007/0003249 A1 | 1/2007 | Taira et al. | |

FOREIGN PATENT DOCUMENTS

| | | |
|---|---|---|
| CN | 1601133 | 5/2005 |
| CN | 1711429 | 12/2005 |
| CN | 1789738 | 6/2006 |
| JP | 2008-215490 A | 9/2008 |

OTHER PUBLICATIONS

Translation of office action from The State Intellectual Property Office of the People's Republic of China, dated Dec. 14, 2012.

* cited by examiner

*Primary Examiner* — Tran Nguyen
*Assistant Examiner* — David Scheuermann

(57) ABSTRACT

A motor includes a rotatable component rotatable relative to a stationary component, a fluid operable to flow between the rotatable and stationary component, and a capillary sealing component. The capillary sealing component provides a capillary seal and includes at least one tapered slot configured to pump the fluid between the rotatable and stationary components.

20 Claims, 7 Drawing Sheets

FLUID PUMPING CAPILLARY SEAL FOR A FLUID DYNAMIC BEARING

BACKGROUND

Disc drive memory systems store digital information that is recorded on concentric tracks on a magnetic disc medium. At least one disc is rotatably mounted on a spindle, and the information, which can be stored in the form of magnetic transitions within the discs, is accessed using read/write heads or transducers. A drive controller is typically used for controlling the disc drive system based on commands received from a host system. The drive controller controls the disc drive to store and retrieve information from the magnetic discs. The read/write heads are located on a pivoting arm that moves radially over the surface of the disc. The discs are rotated at high speeds during operation using an electric motor located inside a hub or below the discs. Magnets on the hub interact with a stator to cause rotation of the hub relative to the stator. One type of motor has a spindle mounted by means of a bearing system to a motor shaft disposed in the center of the hub. The bearings permit rotational movement between the shaft and the sleeve, while maintaining alignment of the spindle to the shaft.

Disc drive memory systems are being utilized in progressively more environments besides traditional stationary computing environments. Recently, these memory systems are incorporated into devices that are operated in mobile environments including digital cameras, digital video cameras, video game consoles and personal music players, in addition to portable computers. These mobile devices are frequently subjected to various magnitudes of mechanical shock as a result of handling. As such, performance and design needs have intensified including improved resistance to shock events including axial and angular shock resistance, vibration response, and improved robustness.

The read/write heads must be accurately aligned with the storage tracks on the disc to ensure the proper reading and writing of information. Moreover, a demand exists for increased storage capacity and smaller disc drives, which has led to the design of higher recording a real density such that the read/write heads are placed increasingly closer to the disc surface. Precise alignment of the heads with the storage tracks is needed to allow discs to be designed with greater track densities, thereby allowing smaller discs and/or increasing the storage capacity of the discs. Because rotational accuracy is critical, many disc drives presently utilize a spindle motor having a fluid dynamic bearing (FDB) situated between a shaft and sleeve to support a hub and the disc for rotation. The stiffness of the fluid dynamic bearing is critical so that the rotating load is accurately and stably supported on the spindle without wobble or tilt. In a hydrodynamic bearing, a lubricating fluid is provided between a fixed member bearing surface and a rotating member bearing surface of the disc drive. Hydrodynamic bearings, however, suffer from sensitivity to external loads or mechanical shock.

A method of providing a compact fluid sealing system is to employ asymmetric sealing. Many bearings utilize an asymmetric fluid sealing system with a capillary seal situated on one end of the bearing, and a grooved pumping seal on an opposite bearing end. However, in these sealing systems, a problem arises known as jog, jog being the rapid and repeated opening and closing of axial spaces between relatively rotatable components that can dispel oil from, or draw air into, these spaces. In contemporary designs, unless the flow resistance of a recirculation channel is sufficiently low, oil will either be expelled from the fluid seals during compression, or air will be drawn into the fluid seals during expansion.

Further, a sufficient amount of lubricant such as oil must be maintained in a capillary seal reservoir to offset losses. If a shock event occurs with a motor having an insufficient volume of lubricant, rotating surfaces may come in direct contact with stationary components. The dry surface-to-surface contact may lead to particle generation or galling and lock-up of the motor during contact. Particle generation and contamination of the bearing fluid may also result in reduced performance or failure of the spindle motor or disc drive components.

SUMMARY

A motor includes a rotatable component rotatable relative to a stationary component, a fluid operable to flow between the rotatable and stationary component, and a capillary sealing component. The capillary sealing component provides a capillary seal and includes at least one tapered slot configured to pump the fluid between the rotatable and stationary components.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein.

DETAILED DESCRIPTION

Exemplary embodiments are described with reference to specific configurations. Those of ordinary skill in the art will appreciate that various changes and modifications can be made while remaining within the scope of the appended claims. Additionally, well-known elements, devices, components, methods, process steps and the like may not be set forth in detail in order to avoid obscuring the invention.

An apparatus and method are described herein for providing a compact, robust, and power efficient fluid sealing system with fluid pumping and capillary features, for a fluid dynamic bearing. The present invention provides improved shock resistance and vibration response, and thereby increases reliability and performance of a disc drive memory system. Concerns of motor jog are addressed, jog being the rapid and repeated opening and closing of axial spaces between relatively rotatable components that can dispel oil from, or draw air into, these spaces. The present invention is especially useful with small form factor disc drives having constraints in motor height, such as a 2.5 inch disc drive, requiring high performance including high rotational speed and large a real density.

It will be apparent that features of the discussion and claims may be utilized with disc drive memory systems, low profile disc drive memory systems, spindle motors, brushless DC motors, various fluid dynamic bearing designs including hydrodynamic and hydrostatic bearings, and other motors employing a stationary and a rotatable component, including motors employing conical bearings. Further, embodiments of the present invention may be employed with a fixed shaft or a rotating shaft. Also, as used herein, the terms "axially" or "axial direction" refers to a direction along a centerline axis length of the shaft (i.e., along axis 260 of shaft 202 shown in FIG. 2), and "radially" or "radial direction" refers to a direction perpendicular to the centerline axis 260, and passing through centerline axis 260. Also, as used herein, the expressions indicating orientation such as "upper", "lower", "top", "bottom", "height" and the like, are applied in a sense related to normal viewing of the figures rather than in any sense of orientation during particular operation, etc. These orientation labels are provided simply to facilitate and aid understanding of the figures as described in this Description and should not be construed as limiting.

Figure 1:
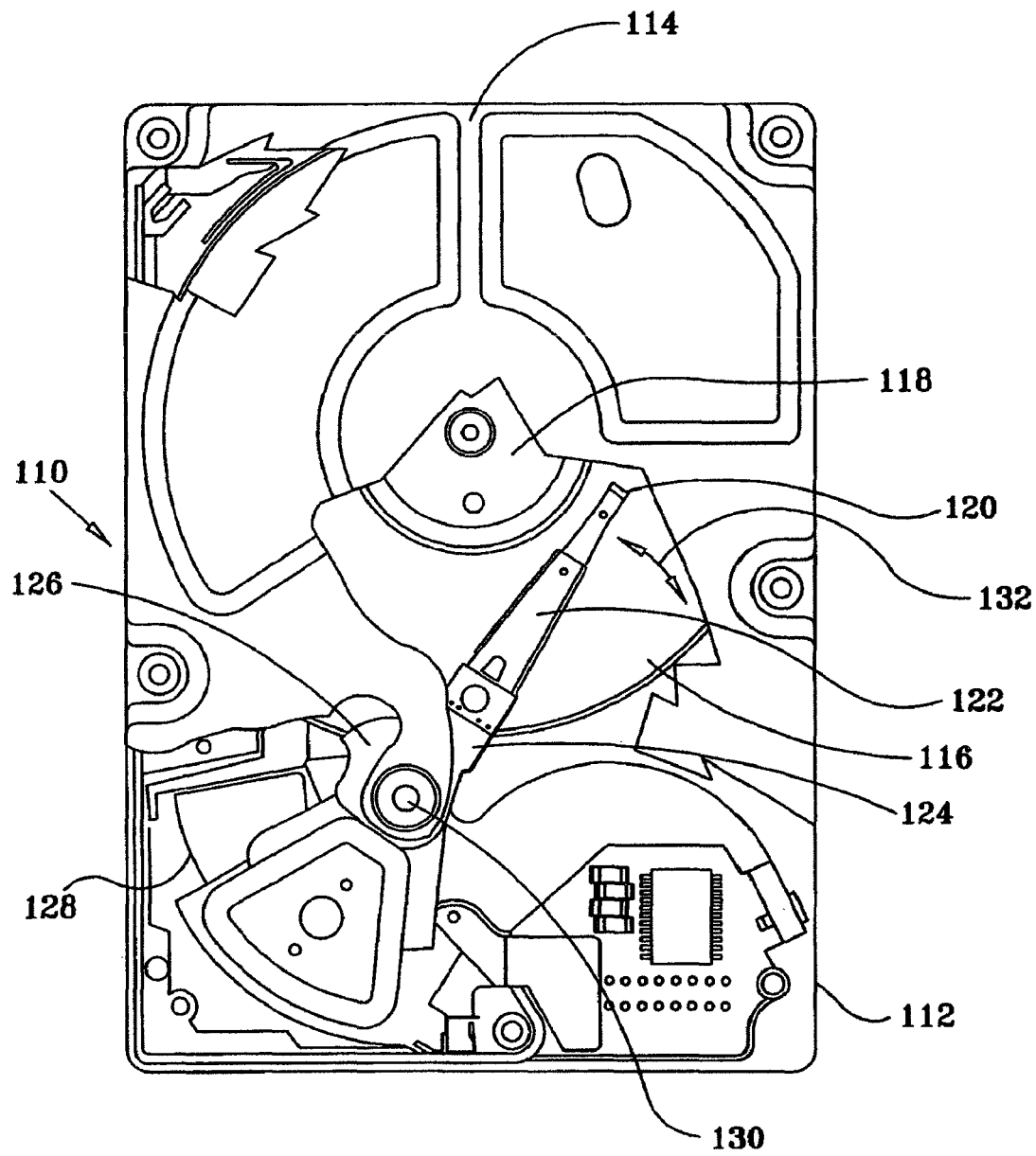
FIG. 1 is a top plan view of a disc drive data storage system in which the present invention is useful, in accordance with an embodiment of the present invention.

Referring to the drawings wherein identical reference numerals denote the same elements throughout the various views, FIG. 1 illustrates a top plan view of a typical disc drive data storage system 110 in which the present invention is useful. Features of the discussion and claims are not limited to this particular design, which is shown only for purposes of the example. Disc drive 110 includes base plate 112 that is combined with cover 114 forming a sealed environment to protect the internal components from contamination by elements outside the sealed environment. Disc drive 110 further includes disc pack 116, which is mounted for rotation on a spindle motor (described in FIG. 2) by disc clamp 118. Disc pack 116 includes a plurality of individual discs, which are mounted for co-rotation about a central axis. Each disc surface has an associated head 120 (read head and write head), which is mounted to disc drive 110 for communicating with the disc surface. In the example shown in FIG. 1, heads 120 are supported by flexures 122, which are in turn attached to head mounting arms 124 of actuator body 126. The actuator shown in FIG. 1 is a rotary moving coil actuator and includes a voice coil motor, shown generally at 128. Voice coil motor 128 rotates actuator body 126 with its attached heads 120 about pivot shaft 130 to position heads 120 over a desired data track along arc path 132. This allows heads 120 to read and write magnetically encoded information on the surfaces of discs 116 at selected locations.

A flex assembly provides the requisite electrical connection paths for the actuator assembly while allowing pivotal movement of the actuator body 126 during operation. The flex assembly (not shown) terminates at a flex bracket for communication to a printed circuit board mounted to the bottom side of disc drive 110 to which head wires are connected; the head wires being routed along the actuator arms 124 and the flexures 122 to the heads 120. The printed circuit board typically includes circuitry for controlling the write currents applied to the heads 120 during a write operation and a preamplifier for amplifying read signals generated by the heads 120 during a read operation.

Figure 2:
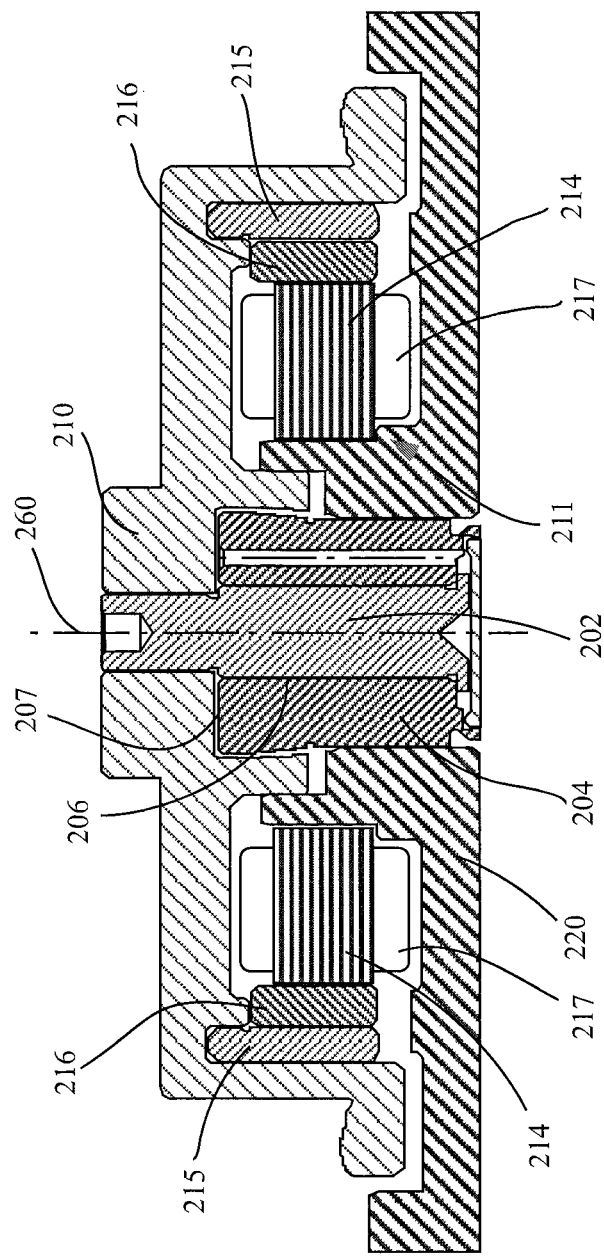
FIG. 2 is a sectional side view of a contemporary spindle motor used in a disc drive data storage system incorporating a contemporary fluid sealing system.

Referring to FIG. 2, a sectional side view is illustrated of a contemporary spindle motor as used in a disc drive data storage system 110. This fluid dynamic bearing motor includes a rotatable component that is relatively rotatable about a stationary component, defining a journal bearing 206 therebetween. In this example, the rotatable components include shaft 202 and hub 210. In an alternative design, the shaft 202 is a stationary component, and the sleeve 204 is a rotatable component. Hub 210 includes a disc flange, which supports disc pack 116 (shown in FIG. 1) for rotation about axis 260 of shaft 202. Shaft 202 and hub 210 are integral with backiron 215. One or more magnets 216 are attached to a periphery of backiron 215. The magnets 216 interact with a lamination stack 214 attached to the base 220 to cause the hub 210 to rotate. Magnet 216 can be formed as a unitary, annular ring or can be formed of a plurality of individual magnets that are spaced about the periphery of hub 210. Magnet 216 is magnetized to form two or more magnetic poles. The stationary components include sleeve 204 and stator 211, which are affixed to base plate 220. Bearing 206 is established between the sleeve 204 and the rotating shaft 202. A thrust bearing 207 is established between hub 210 and sleeve 204. Thrust bearing 207 provides an upward force on hub 210 to counterbalance the downward forces including the weight of hub 210, axial forces between magnet 216 and base plate 220, and axial forces between stator lamination stack 214 and magnet 216. In the case of a fluid dynamic bearing spindle motor, a fluid, such as lubricating oil fills the interfacial regions between shaft 202 and sleeve 204, and between hub 210 and sleeve 204, as well as between other stationary and rotatable components. While the present figure is described herein with a lubricating fluid, those skilled in the art will appreciate that useable fluids include a liquid, a gas, or a combination of a liquid and gas.

Figure 3:
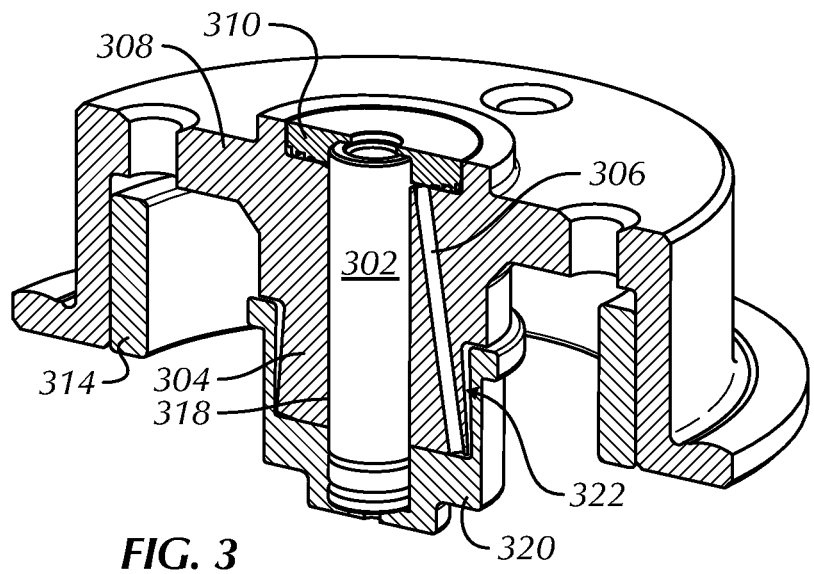
FIG. 3 is a perspective view of a cross section of a portion of a fluid dynamic bearing motor, illustrating a pumping capillary sealing system in the form of a retainer, in accordance with an embodiment of the present invention.

FIG. 3 is a perspective view of a cross section of a portion of a fluid dynamic bearing motor, illustrating a fluid pumping capillary sealing system 310 in the form of a retainer (referred to as PCS retainer 310), in accordance with an embodiment of the present invention. A bearing 318 containing fluid is defined between facing surfaces of shaft 302 and sleeve 304. PCS retainer 310 is positioned at an end of the bearing, for sealing the fluid within the motor. In the example shown, a capillary sealing component 320 having a fluid reservoir 322 is positioned at an axially opposite end of the motor. In an alternative embodiment, a second pumping capillary sealing system is utilized at the axially opposite end of the motor from the pumping capillary sealing system 310. It is to be appreciated that other fluid seals or designs may be utilized at the axially opposite end from the fluid pumping capillary sealing system 310. Further, the present invention may be designed as, or utilized with, either an asymmetric sealing system or a symmetric sealing system.

Together, the pumping capillary sealing system 310 and the capillary sealing component 320 provide an asymmetric sealing system. The pumping capillary seal acts as a stiffer, lower volume seal, while the capillary seal acts as a softer, higher volume seal. Stiff and soft refer to the tendency of the respective seals to push fluid into the contained volume of the motor, which is a measure of the ratio of pressure change to volume change. When the motor transitions from stationary to a spinning condition, the pumping capillary sealing system 310 pumps fluid into the capillary seal. Inexact balancing of the two seals can thus be allowed. The pumping capillary sealing system 310 pumps fluid toward the capillary seal until the pumping capillary seal reduces to a fluid volume to reach an equilibrium pressure with the capillary seal. That is, the pressure capability of the pumping capillary seal decreases as it looses fluid volume at a faster rate than the corresponding increase in pressure capability (with increasing fluid volume) of the capillary seal. The fluid is thereby contained within the motor. In an embodiment, the area within the pumping capillary seal that was previously occupied by fluid is replaced by air, by way of vent holes (described below).

In the example embodiment illustrated, the stationary shaft 302 is affixed to the pumping capillary sealing system 310, as well as to the capillary sealing component 320. The shaft 302 may further be affixed to a top cover (TCA) for added motor stability. Rotatable hub 308 and sleeve 304 rotate about a centerline axis of shaft 302. There is a tradeoff of motor stiffness when designing motors with axial space savings. The present invention address this concern and provides improved stiffness, resulting in the read/write heads of a storage device being accurately aligned with storage tracks on a disc, when the device is subjected to vibration. This allows discs to be designed with increased track densities, and also allows for smaller discs and/or increased storage capacity of discs. In particular, the stiffness of the fluid dynamic bearing is critical so that the rotating load is accurately and stably supported on the spindle without wobble or tilt.

The pumping capillary seal is fluidly connected to the capillary seal by way of a fluid recirculation passageway 306 formed through the sleeve 304. Contemporary motor design concerns of dry surface-to-surface contact, because of loss of lubricating fluid and the flow resistance of a recirculation channel, are minimized because of the present invention fluid pumping capillary sealing system.

In an embodiment, the fluid pumping capillary sealing system 310 is also formed as a limiter, the limiter affixed to the rotatable component. The limiter is employed for limiting axial displacement of the rotatable components with respect to the stationary components. The radially extending surface 346 (FIG. 4) of the PCS retainer 310 also provides a fluid containing surface, addressing concerns of dry surface-to-surface contact with the facing relatively rotatable surface.

Figure 4:
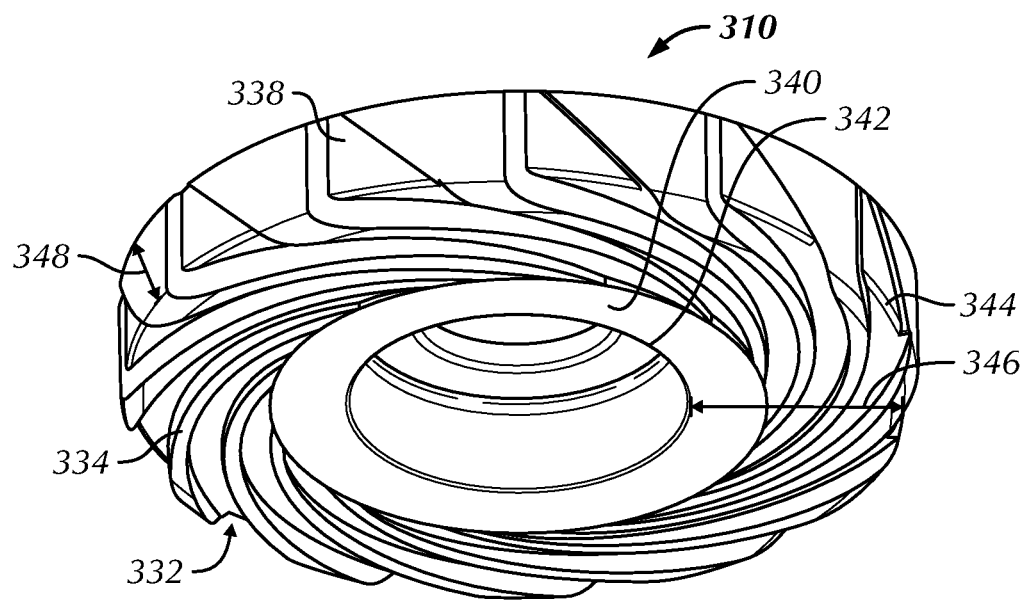
FIG. 4 is an enlarged perspective view of a pumping capillary sealing system in the form of a retainer, as in FIG. 3, in accordance with an embodiment of the present invention.

Referring to FIG. 4, an enlarged perspective view is illustrated of a pumping capillary sealing system in the form of a retainer (PCS retainer 310), as in FIG. 3, in accordance with an embodiment of the present invention. The PCS retainer 310 has a radially extending surface 346 and an axially extending surface 348, with reference to a centerline axis length of the shaft (i.e., along axis 260 of shaft 202 shown in FIG. 2). The radially extending surface 346 extends from inner diameter (ID) 342 to outer diameter (OD) 344. Radially extending surface 346 and axially extending surface 348 join at a junction of OD 344. Alternatively, surfaces 346 and 348 may extend at an angle rather than substantially axially or radially.

The pumping capillary sealing system includes slot portions 332 and rib portions 334 formed on the radially extending surface 346, for pumping fluid toward the bearing. In an embodiment, these fluid pumping grooves extend up to an outer perimeter of surface 340, such that rib portions and slot portions are absent from the inner diameter 342. Fluid thus continuously remains upon surface 340 adjacent to fluid bearing 318. The slot portions 332 are axially tapered and/or radially tapered to increasingly diverge with respect to distance from the bearing (from ID 342), as further described in FIG. 7. These fluid pumping grooves may be shaped in a variety of forms, including a spiral shape or a herringbone shape.

The pumping capillary sealing system also includes a capillary seal. The slot portions 332 diverges at least to an area such that a capillary seal fluid meniscus extending from the tapered slot 332 can shift radially with respect to the bearing, when the rotatable component is stationary with respect to the stationary component. It is to be appreciated that the fluid meniscus can also shift radially, with respect to the bearing, when the motor is rotating. The slot portions 332 thus provides for fluid containment when the motor is stationary. When the motor spins, the spiral pumping shape pumps the fluid in the capillary seal toward the bearing. The varying depth of the slots 332 provide for fluid storage and an air containment groove. In an embodiment, the air containment groove is vented to accommodate rapid changes in fluid volume due to jog.

Figure 5:
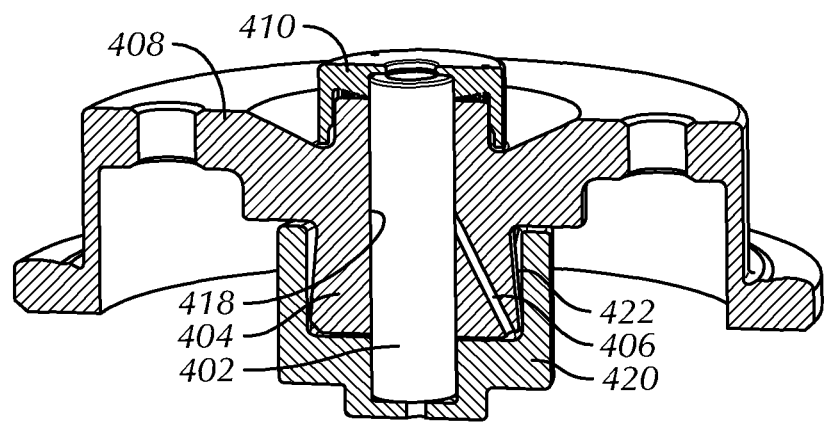
FIG. 5 is a perspective view of a cross section of a portion of a fluid dynamic bearing motor, illustrating a pumping capillary sealing system in the form of a cup, in accordance with another embodiment of the present invention.

In the embodiment illustrated, axially extending surface 448 is without pumping ribs Turning now to FIG. 5, a perspective view is shown of a cross section of a portion of a fluid dynamic bearing motor, illustrating a pumping capillary seal in the form of a cup, in accordance with another embodiment of the present invention. A bearing 418 containing fluid is defined between facing surfaces of shaft 402 and sleeve 404. PCS cup 410 is positioned at an end of the bearing, for sealing the fluid within the motor. In the example shown, a capillary sealing component 420 having a fluid reservoir 422 is positioned at an axially opposite end of the motor.

Together, the pumping capillary sealing system 410 and the capillary sealing component 420 provide an asymmetric sealing system. The pumping capillary seal acts as a stiffer, lower volume seal, while the capillary seal acts as a softer, higher volume seal. Stiff and soft refer to the tendency of the respective seals to push fluid into the contained volume of the motor, which is a measure of the ratio of pressure change to volume change. When the motor transitions from stationary to a spinning condition, the pumping capillary sealing system 410 pumps fluid into the capillary seal. Inexact balancing of the two seals can thus be allowed. The pumping capillary sealing system 410 pumps fluid toward the capillary seal, until the pumping capillary seal looses enough fluid volume to reach an equilibrium pressure with the capillary seal. That is, the pressure capability of the pumping capillary seal decreases as it looses volume at a faster rate than the corresponding increase in pressure capability (with increasing fluid volume) of the capillary seal. The fluid is thereby contained within the motor.

In the example embodiment illustrated, the stationary shaft 402 is affixed to the pumping capillary sealing system 410, as well as to the capillary sealing component 420. The shaft 402 may further be affixed to a top cover (TCA) for added stability. Rotatable hub 408 and sleeve 404 rotate about a centerline axis of shaft 402.

The pumping capillary seal is fluidly connected to the capillary seal by way of a fluid recirculation passageway 406 formed through the sleeve 404. Contemporary motor design concerns of dry surface-to-surface contact, because of loss of lubricating fluid and the flow resistance of a recirculation channel, are minimized because of the present invention fluid pumping capillary sealing system.

In an embodiment, the fluid pumping capillary sealing system 410 is also formed as a limiter, the limiter affixed to the rotatable component. The limiter is employed for limiting axial displacement of the rotatable components with respect to the stationary components. The radially extending surface 446 (FIG. 6) of the PCS cup 410 also provides a fluid containing surface, addressing concerns of dry surface-to-surface contact with the facing relatively rotatable surface.

Figure 6:
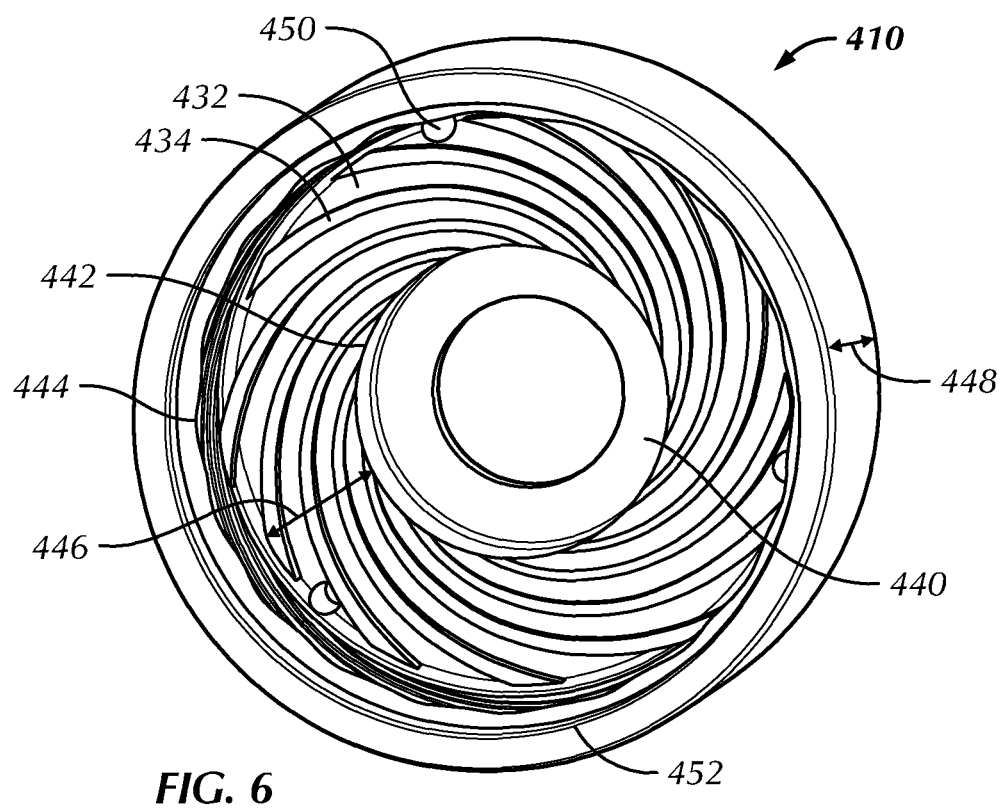
FIG. 6 is an enlarged perspective view of a pumping capillary sealing system in the form of a cup, as in FIG. 5, in accordance with an embodiment of the present invention.

FIG. 6 illustrates an enlarged perspective view of a pumping capillary sealing system in the form of a cup (PCS cup 410), as in FIG. 5, in accordance with an embodiment of the present invention. PCS cup 410 has a radially extending surface 446 and an axially extending surface 448, with reference to a centerline axis length of the shaft (i.e., along axis 260 of shaft 202 shown in FIG. 2). The radially extending surface 446 extends from inner diameter (ID) 442 to outer diameter (OD) 444. Radially extending surface 446 and axially extending surface 448 join at a junction of OD 444. Alternatively, surfaces 446 and 448 may extend at an angle rather than substantially axially or radially.

The pumping capillary sealing system includes slot portions 432 and rib portions 434 formed on the radially extending surface 446, for pumping fluid toward the bearing. In an embodiment, these fluid pumping grooves extend to an outer perimeter of surface 440, wherein surface 440 interfaces with shaft 402. The slot portions 432 are axially tapered and/or radially tapered to increasingly diverge with respect to distance from the bearing (from ID 442), as further described in FIG. 7. These fluid pumping grooves may be shaped in a variety of forms, including a spiral shape or a herringbone shape.

The pumping capillary sealing system also includes a capillary seal. The slot portions 432 diverges at least to an area such that a capillary seal fluid meniscus extending from the tapered slot 432 can shift radially with respect to the bearing, when the rotatable component is stationary with respect to the stationary component. It is to be appreciated that the fluid meniscus can also shift radially, with respect to the bearing, when the motor is rotating. The slot portions 432 thus provides for fluid containment when the motor is stationary. When the motor spins, the spiral pumping shape pumps the fluid in the capillary seal toward the bearing. The varying depth of the slots 432 provide for fluid storage and an air containment groove. In an embodiment, the air containment groove is vented by vents 450 to accommodate rapid changes in fluid volume due to jog.

In the embodiment illustrated, axially extending surface 448 also includes auxiliary pumping ribs 438. These auxiliary pumping ribs 438 extend the pumping surface to a greater distance, which further ensures fluid is retained within the motor. In an alternative embodiment, axially extending surface 448 is without pumping ribs.

Figure 7:
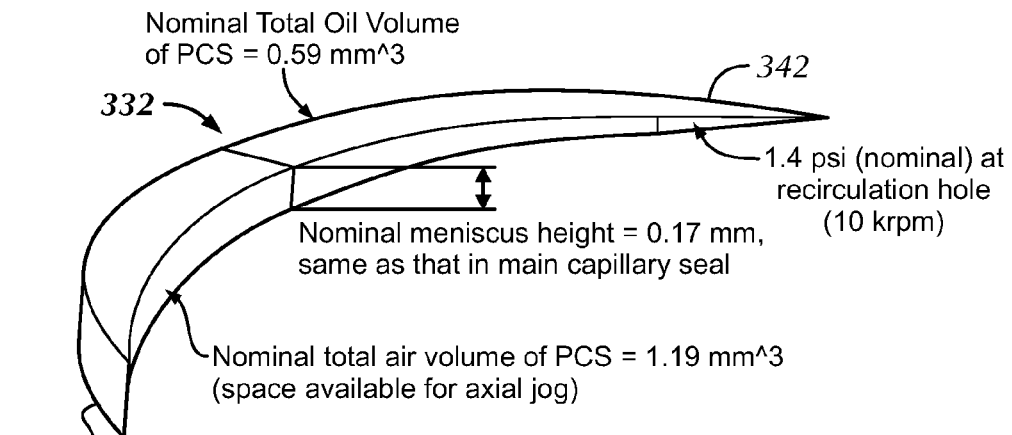
FIG. 7 is a representative view showing oil volume from a pumping capillary seal groove or slot, as in FIG. 4 or FIG. 6, in accordance with an embodiment of the present invention.

FIG. 7 is a representative view showing oil volume from a pumping capillary seal groove or slot, as in FIG. 4 or FIG. 6, in accordance with an embodiment of the present invention. The oil volume shown represents the volume within slot portions 332 (FIG. 4). The inner diameter (ID) 342 and the outer diameter (OD) 344 are indicated. The slot portions 332 are axially tapered and/or radially tapered to increasingly diverge with respect to distance from the bearing (from ID 342). In an embodiment, these slot portions 332 are tapered in three dimensions. In an example embodiment, the slot portion 322 has an axial depth in the range of up to 30 microns at inner diameter (ID) 342 radially closest to the bearing, and 50 microns to 400 microns at outer diameter (OD) 344 radially furthest from the bearing.

In the example embodiment as shown, the nominal total oil volume of the slot portion 332 is 0.59 mm$^3$. The nominal fluid meniscus height is 0.17 mm, which is equivalent to the nominal meniscus height of the capillary seal at the axially opposite end of the motor when the motor is at rest and stationary. The nominal total air volume of the slot portions 332 is 1.19 mm$^3$. This also represents the space available for axial jog. The nominal pumping pressure at a junction of the slot portion 332 and the recirculation passageway 306 is 1.4 psi at 10 krpm. Other values may be designed within the pumping capillary sealing system, and are contemplated by the teachings herein.

Figure 8:
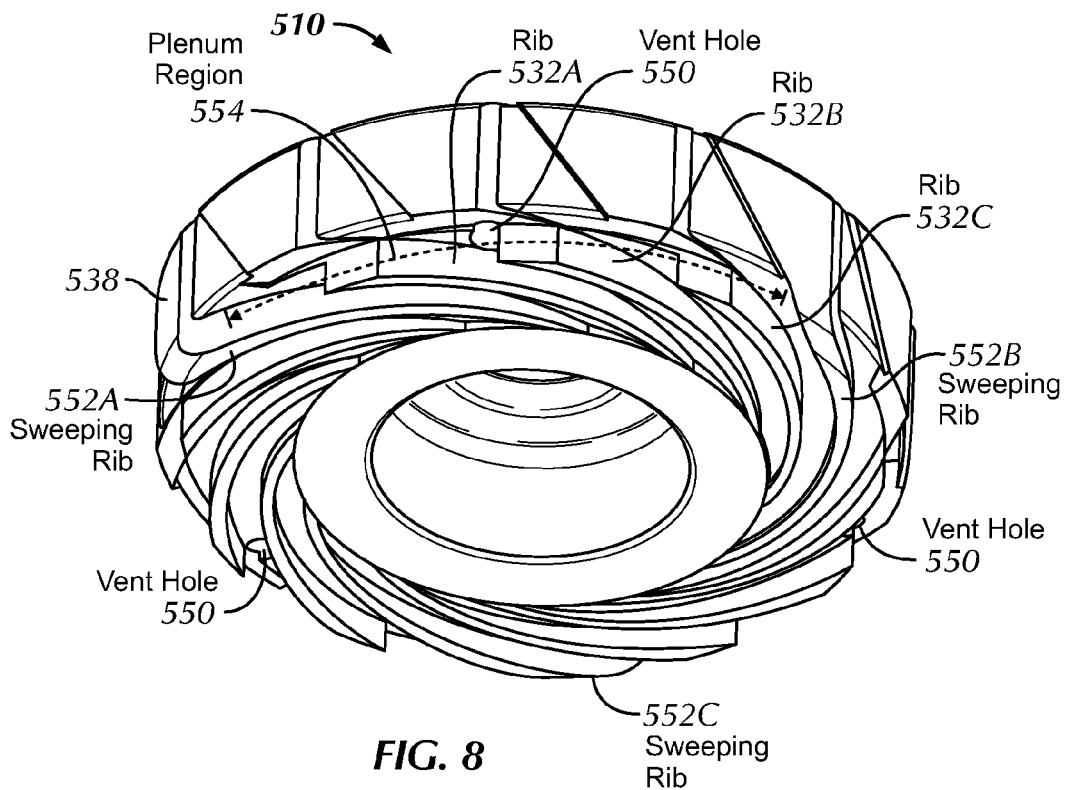
FIG. 8 is an enlarged perspective view of a pumping capillary sealing system in the form of a retainer, as in FIG. 3, and further comprising sweeping ribs and a plenum region, in accordance with an embodiment of the present invention.

FIG. 8 illustrates another embodiment of an enlarged perspective view of a pumping capillary seal in the form of a retainer 510, as in FIG. 3, and further comprising sweeping ribs 552A-552C, and a plenum region 554, in accordance with an embodiment of the present invention. The sweeping ribs 552A-552C and plenum region 554 are situated on a radially extending surface. The sweeping rib 552A extends to an auxiliary pumping rib 538 situated on an axially extending surface. Similarly, sweeping ribs 552B and 552C extend to other auxiliary pumping ribs situated on the axially extending surface. The sweeping ribs 552A-552C are situated for sweeping fluid from the axially extending surface to the radially extending surface and toward the bearing. Further, in the example shown, three truncated ribs (532A, 532B, 532C) are situated between sweeping ribs 552A and 552B. The three slots or grooves adjacent to the truncated ribs are thus in fluid communication with each other. The truncated ribs also pump fluid toward the bearing, but extend a shorter radial distance as compared to the sweeping ribs, so as to provide a plenum region 554 situated at a radial end of the truncated ribs. In an embodiment, this plenum region 554 communicates with a vent hole 550 to ensure all slots are vented.

Fluid containment is provided within the slots adjacent to the sweeping ribs and the truncated ribs when the motor is stationary. However, plenum region 554 provides an added and increased fluid containment region for rapid oil volume changes, for example due to jog or a shock event. These slots also provide for air containment, which can be vented from the motor by way of vent holes 550. The vent holes 550 are situated within the plenum region. In an alternative embodiment without the vent holes 550, as the motor spins and the pumping capillary seal transfers fluid into fluid reservoir, the slots receive air from their corresponding pumping groove.

Figure 9:
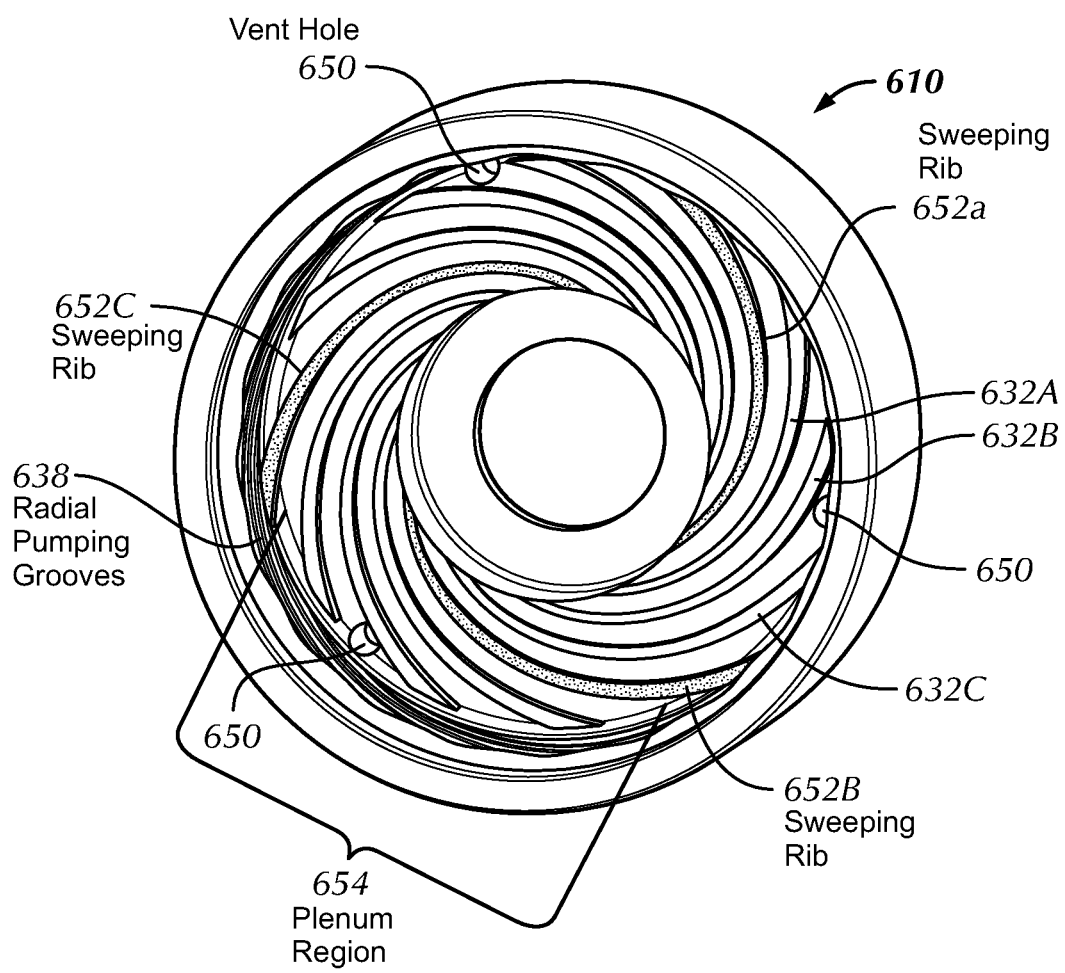
FIG. 9 is an enlarged perspective view of a pumping capillary sealing system in the form of a cup, as in FIG. 5, and further comprising sweeping ribs and a plenum region, in accordance with an embodiment of the present invention.

FIG. 9 is an enlarged perspective view of a pumping capillary seal in the form of a cup 610, as in FIG. 5, and further comprising sweeping ribs 652A-652C, and a plenum region 654, in accordance with an embodiment of the present invention.

The sweeping ribs 652A-652C and plenum region 654 are situated on a radially extending surface. The sweeping rib 652C extends to an auxiliary pumping rib 638 situated on an axially extending surface. Similarly, sweeping ribs 652A and 652B extend to other auxiliary pumping ribs situated on the axially extending surface. The sweeping ribs 652A-652C are situated for sweeping fluid from the axially extending surface to the radially extending surface and toward the bearing. Further, in the example shown, three truncated ribs (632A, 632B, 632C) are situated between sweeping ribs 652A and 652B. The truncated ribs also pump fluid toward the bearing, but extend a shorter radial distance as compared to the sweeping ribs, so as to provide a plenum region 654 situated at a radial end of the truncated ribs. In an embodiment, this plenum region 654 communicates with a vent hole 650 to ensure all slots are vented.

Fluid containment is provided within the slots adjacent to the sweeping ribs and the truncated ribs when the motor is stationary. However, plenum region 654 provides an added and increased fluid containment region for rapid oil volume changes, for example due to jog or a shock event. These slots also provide for air containment, which can be vented from the motor by way of vent holes 650. The vent holes 650 are situated within the plenum region. In an alternative embodiment without the vent holes 650, as the motor spins and the pumping capillary seal transfers fluid into fluid reservoir, the slots receive air from their corresponding pumping groove.

Figure 10:
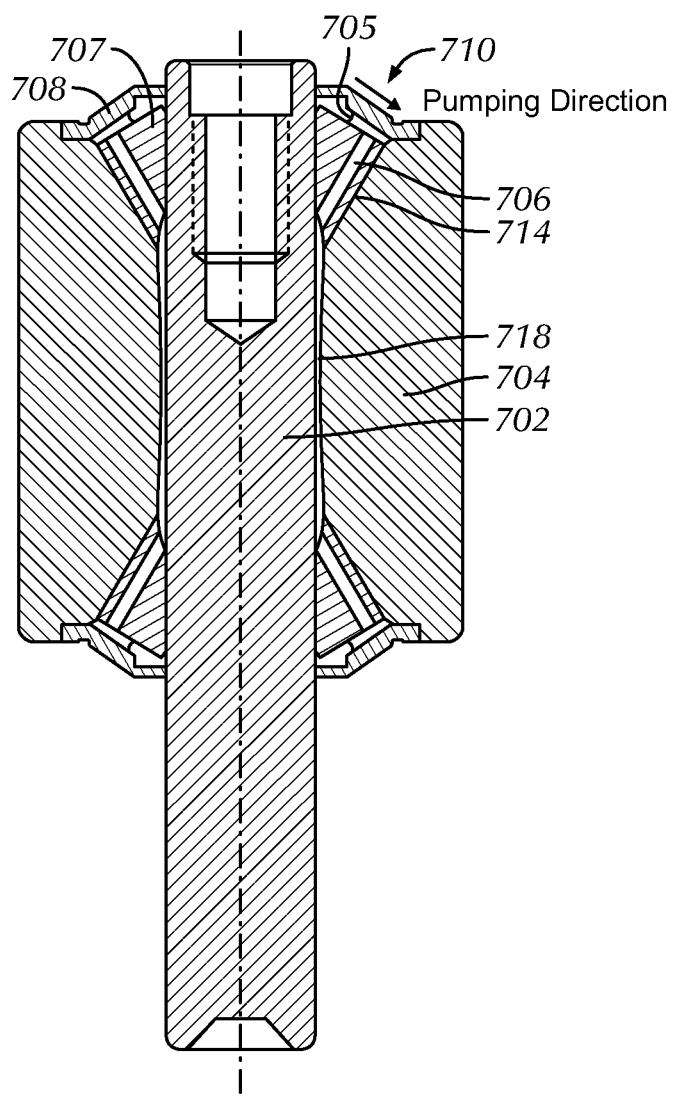
FIG. 10 is a sectional side view of a portion of a fluid dynamic bearing motor having a conical component, illustrating a pumping capillary sealing system, in accordance with another embodiment of the present invention.

Referring to FIG. 10, a sectional side view of a portion of a fluid dynamic bearing motor having a conical component is shown, illustrating a pumping capillary sealing system 710, in accordance with another embodiment of the present invention. A bearing 714 is defined between conical component 707 and sleeve 704. An interconnection passageway 718 is defined between the relatively rotatable shaft 702 and sleeve 704. A fluid pumping capillary sealing system 710 is positioned at at least one end of the bearing, for sealing fluid within the motor. Fluid pumping capillary sealing system 710 can be positioned on a facing surface of the shield 708 or the conical component 707. In the example shown, the shield 708 and the conical component 707 are fixed to the sleeve 704. A fluid passageway 706 is formed through the conical component 707 and is in fluid communication with the bearing 718. As in the previous designs described, the fluid pumping capillary sealing system 710 includes a fluid pumping groove and a capillary seal. The fluid pumping groove comprises a slot portion and a rib portion, wherein the slot portion increasingly diverges. The pumping direction is illustrated as an example. The capillary seal is positioned at the facing surfaces of the shield 708 and the conical component 707. The slot portion diverges at least to an area to enable a capillary seal fluid meniscus 705, extending from the diverging slot, to shift.

Modifications and variations may be made to the disclosed embodiments while remaining within the spirit and scope of the invention. The implementations described above and other implementations are within the scope of the following claims.

We claim:

1. A motor comprising:
   a rotatable component rotatable relative to a stationary component;
   a fluid operable to flow between the rotatable and stationary component; and
   a capillary sealing component including at least one tapered slot configured to pump the fluid between the rotatable and stationary components, wherein the at least one tapered slot comprises a first end and a second end, wherein a width of the at least one tapered slot at the first end is different than a width at the second end.

2. The motor of claim 1, wherein a height of the at least one tapered slot at the first end is different than a height at the second end.

3. The motor of claim 1, wherein the capillary sealing component includes a plurality of ribs.

4. The motor of claim 1, wherein the at least one tapered slot spirals radially outward.

5. The motor of claim 1, wherein the capillary sealing component includes at least one vent hole.

6. The motor of claim 1, wherein the capillary sealing component includes a plurality of tapered slots.

7. The motor of claim 1, wherein the capillary sealing component includes ribs positioned on an axially-extending surface of the capillary sealing component.

8. The motor of claim 1, wherein the stationary component is a shaft, and wherein the capillary sealing component is positioned adjacent to a top surface of the shaft.

9. The motor of claim 8, further comprising:
   a bottom capillary sealing component positioned adjacent to a bottom surface of the shaft.

10. The motor of claim 8, wherein the capillary sealing component partially receives and is affixed to a top portion of the shaft.

11. A motor comprising:
    a rotatable component rotatable relative to a stationary component;
    a fluid operable to flow between the rotatable and stationary component; and
    a capillary sealing component including at least one tapered slot configured to pump the fluid between the rotatable and stationary components, wherein the capillary sealing component includes a plurality of ribs.

12. The motor of claim 11, wherein the capillary sealing component includes a plurality of tapered slots.

13. The motor of claim 12, wherein the plurality of tapered slots each have a first end and a second end, wherein a width of each of the plurality of tapered slots at the first end is different than a width at the second end.

14. The motor of claim 11, wherein the at least one tapered slot spirals radially outward.

15. The motor of claim 11, wherein the capillary sealing component includes at least one vent hole.

16. The motor of claim 11, wherein the capillary sealing component includes ribs positioned on an axially-extending surface of the capillary sealing component.

17. A motor comprising:
    a rotatable component rotatable relative to a stationary component;
    a fluid operable to flow between the rotatable and stationary component; and
    a capillary sealing component including at least one tapered slot that spirals radially outward and is configured to pump the fluid between the rotatable and stationary components.

18. The motor of claim 17, wherein the capillary sealing component includes at least one vent hole.

19. The motor of claim 17, wherein the capillary sealing component includes ribs positioned on an axially-extending surface of the capillary sealing component.

20. The motor of claim 17, wherein the capillary sealing component includes a plurality of tapered slots spiraling radially outward, and wherein each of the plurality of tapered slots increase in volume as the slots extend radially outward.

* * * * *